US006816822B1

United States Patent
Hess et al.

(10) Patent No.: US 6,816,822 B1
(45) Date of Patent: Nov. 9, 2004

(54) SYSTEM AND METHOD FOR DYNAMIC MODELING, PARAMETER ESTIMATION AND OPTIMIZATION FOR PROCESSES HAVING OPERATING TARGETS

(75) Inventors: Todd M. Hess, Chagrin Falls, OH (US); Martyn Glenn Richards, North Chili, NY (US); Andreas Kroll, Heidelberg (DE)

(73) Assignees: ABB Automation Inc., Wickliffe, OH (US); ABB AG, Heidelberg (DE)

( * ) Notice: Subject to any disclaimer, the term of this patent is extended or adjusted under 35 U.S.C. 154(b) by 1021 days.

(21) Appl. No.: 09/639,543

(22) Filed: Aug. 16, 2000

(51) Int. Cl.[7] .......................... G06F 17/10; G06F 7/60; G06G 7/48; G05B 13/02
(52) U.S. Cl. ................................ 703/2; 703/6; 700/32
(58) Field of Search .......................... 703/2, 6; 700/32

(56) References Cited

U.S. PATENT DOCUMENTS 6,038,540 A * 3/2000 Krist et al. .................... 705/8
6,041,263 A * 3/2000 Boston et al. ................ 700/32

* cited by examiner

Primary Examiner—Hugh Jones
(74) Attorney, Agent, or Firm—Michael M. Rickin, Esq.

(57) ABSTRACT

A technique to provide dynamic modeling, parameter estimation and optimization for processes having operating targets. The technique has an optimization cycle and a simulation cycle. The simulation cycle runs at a rate that is equal to or faster than the run rate of the optimization cycle. Both cycles obtain data from the field about the process. The optimization cycle provides a simulation execution of a dynamic process model and the results of that simulation are used to match the model response to the actual plant response. This matching determines if a dynamic parameter estimation and data reconciliation is needed for the model parameters. Optimized operating targets are determined using either the estimated and reconciled parameters and data or if the same is not needed the collected process data. Mathematical and heuristic assessment tools are used to determine if the optimized operating targets should or should not be invoked.

21 Claims, 1 Drawing Sheet

SYSTEM AND METHOD FOR DYNAMIC MODELING, PARAMETER ESTIMATION AND OPTIMIZATION FOR PROCESSES HAVING OPERATING TARGETS

FIELD OF THE INVENTION

This invention relates to processes having operating targets and more particularly to using dynamic modeling, parameter estimation and optimization for such operations.

DESCRIPTION OF THE PRIOR ART

One example of a process that has operating targets is a blending operation. Steady-state modeling systems and steady-state optimization have been used for quite some time with blending operations such as the blending of crude oil and gasoline.

A well-developed feature of many steady-state modeling systems is their ability to take on-line, real-world data and match the response values against a model of the system to make certain data inferences. The advantages to this procedure is that it:

a. corrects errors such as thermocouple drift and orifice plate degradation that may be present in plant sensor measurements;

b. identifies values for unmeasured disturbances such as unmetered flowrates and feed quality characteristics that occur to the system that will impact how the process should most efficiently operate; and c. establishes equipment operating parameters such as exchanger heat transfer coefficients and distillation efficiencies that change during or through the operation of the process.

There are, however, disadvantages to solely using steady state data reconciliation and parameter estimation. The disadvantages include:

a. their inability to process data from a dynamically changing process; and b. a limited set of data points from which to process data.

In reality, most steady-state optimization systems that rely upon steady-state data reconciliation and parameter estimation are ill-designed particularly if an operator is depending upon the optimization system to make efficient changes to the system as there will always be some dynamic movement in the plant. Without data reconciliation using dynamic data, the optimization engine would be forced to operate on a model with inaccurate data.

The benefits of steady-state optimization are well known to those skilled in the art. One example of such optimization is described in U.S. Pat. No. 3,940,600 entitled "Method and Apparatus For On-Line Non-Interactive Blending Using An Uncoupling Matrix." The method and apparatus described therein is identified for blending and in particular for blending liquid products, e.g. petroleum. The model representation of the blended product is a linear, steady-state model representation for determining the output control signals, e.g. component flowrates.

U.S. Pat. No. 5,933,345 entitled "Method and Apparatus For Dynamic and Steady-State Modeling Over A Desired Path Between Two End Points" describes the combined use of a steady-state, that is, static, model and then a dynamic model to meet the use objectives. The steady-state model is described as a neural-network representation of the plant or system to identify gains for the dynamic model. The dynamic model is described as of a linear nature. The dynamic gains are adjusted based upon the prior built static model in an effort to make the dynamic model better match the true operations of the plant.

U.S. Pat. No. 5,499,188 entitled "Flexible Method For Building A Recipe In A Process Control System" addresses the general nature of recipe formulation and how that recipe should be invoked through a control system configuration. The method described in this patent does not use actual plant response(s) to either estimate parameters or adjust the recipe. Additionally, the method described in this patent does not address planned, multiple recipe formulations.

U.S. Pat. No. 4,786,182 entitled "Method And Means For Controlling A Fodder Mixing Plant" discloses a method to optimize, in relation to the total production costs, the recipe that affects the physical properties of produced pellets based upon the current sampling of the pellets and raw materials.

U.S. Pat. No. 4,642,766 entitled "Method And Means Of Control For Multi-Source Feedstock Distribution System Including Optimization Of Supplies" discloses the optimization of such distribution where current flow and even property values if available can be adjusted to optimally distribute the feedstock in an effort to minimize the total cost of the feed. U.S. Pat. No. 3,826,904 entitled "Method And Apparatus For The Optimum Blending Of Lubricating Base Oils And An Additive" describes a method and apparatus for enabling the computation of a minimum cost for lubricating oil base stocks to its product specifications. Non-linear formulae are used in arriving at the optimum blend specification.

In contrast to the foregoing the method and apparatus of the present invention uses:

a. a non-linear, rigorous dynamic model that represents both the dynamic and steady-state behavior of the plant and the blending system;

b. parameter estimation to among other things:
  i. estimate component or feed properties;
  ii. update the measured disturbances and other model inputs to ensure the results actually obtained from the plant or system in real-time match the output of the model, that is, such estimation forces the model to match the plant; and
  iii. avoid requiring continuous sampling of raw materials.

c. constrained dynamic optimization to among other things:
  i. determine when and how multiple recipes should be invoked over the course of a blend;
  ii. predict recipes or operating points over the entire run-life of a blend cycle given process constraints without the need to ever achieve a steady-state operating state;
  iii. identify the optimum times the new recipes or targets should be implemented in the blend cycle to achieve the lowest potential blend cost; and
  iv. state how multiple recipes can be formulated and optimized.

While the benefits of steady-state optimization have been well documented in the art, dynamic optimization provides an even more powerful tool that has the potential of providing even greater economic rewards. The need to project out and make economic determinations on both the blend recipe and the extent of time a particular recipe should be invoked can arise in many instances. Some examples include:

a. a change in product specification based upon higher level planning and scheduling decisions;

b. recognizing the loss of availability of a particular blend component;
c. lining up the blender for an on-line start to the next scheduled blend;
d. a failure to recognize or invoke the most optimum blend specification; and
e. optimally correcting for tank heal or existing tender properties.

Increasing the number of recipes over the course of the blend allows the optimizer to take the best possible advantage of the equipment utilization against the constraints for the blended components that are available.

While the technique of the present invention will be described herein in connection with a process plant that is a blending operation those of ordinary skill in the art will appreciate that the technique of the present invention may also be used in connection with any process which uses recipes as operating targets or any other operating targets such as setpoints.

SUMMARY OF THE INVENTION

A method for dynamically optimizing a process. The method has the steps of performing an optimization cycle at a first rate and simultaneously performing with the optimization cycle a simulation cycle at a second rate which is equal to or faster than said first rate. The simulation cycle has the steps of collecting data about the process; using the collected process data to execute in a predefined time interval during the simulation cycle a dynamic simulation for a dynamic model of said process; and storing data for the dynamic simulation.

The optimization cycle has the steps of:
collecting data about the process;
determining if a dynamic parameter estimation and data reconciliation procedure is needed to minimize differences between the collected process data and the data stored for the dynamic simulation where that data was calculated during a simulation cycle corresponding to a period of time which is the same as the time period during which the process data was collected during the simulation cycle;
performing a dynamic parameter estimation and data reconciliation procedure to provide updated parameters and reconciled measurements for the data stored for the dynamic simulation when the procedure has been determined to be needed; and
calculating optimum operating targets for the dynamic process model either from the collected process data when the dynamic parameter estimation and data reconciliation procedure is not needed or from the updated parameters and reconciled measurements when the procedure has been determined to be needed.

A method for dynamically optimizing a process that has the steps of performing an optimization cycle at a first rate and simultaneously performing with the optimization cycle a simulation cycle at a second rate which is equal to or faster than the first rate. The optimization and simulation cycles both have the step of collecting data about the process.

The simulation cycle has the additional steps of:
using the collected process data to execute in a predefined time interval during the simulation cycle a dynamic simulation for a dynamic model of the process; and
storing data for the dynamic simulation.
The optimization cycle has the additional steps of:
performing a dynamic parameter estimation and data reconciliation procedure to provide updated parameters and reconciled measurements for the data stored for the dynamic simulation when the dynamic parameter estimation and data reconciliation procedure is needed to minimize differences between the collected process data and the data stored for the dynamic simulation calculated during a simulation cycle corresponding to a period of time which is the same as the time period during which the process data was collected during the simulation cycle;
calculating optimum operating targets for said dynamic process model from said updated parameters and reconciled measurements;
determining if said optimized operating targets should be invoked;
determining if said optimization cycle should be exited if said optimized operating targets should not be invoked;
waiting until the start of the next optimization cycle when said optimization cycle should not be exited; and
updating a system for controlling said process when said optimized operating targets should be invoked.

A method for dynamically optimizing a process that has the steps of performing an optimization cycle at a first rate and performing simultaneously with the optimization cycle a simulation cycle at a second rate which is equal to or faster than said first rate. The optimization and simulation cycles both have the step of collecting data about said process.

The simulation cycle has the additional steps of:
using said collected process data to execute in a predefined time interval during said simulation cycle a dynamic simulation for a dynamic model of said process; and
storing data for said dynamic simulation;
The optimization cycle has the additional steps of:
performing a dynamic parameter estimation and data reconciliation procedure to provide updated parameters and reconciled measurements for said data stored for said dynamic simulation when said procedure is needed to minimize differences between said collected process data and said data stored for said dynamic simulation calculated during a simulation cycle corresponding to a period of time which is the same as the time period during which said process data was collected during said simulation cycle; and
calculating optimum operating targets for said dynamic process model from said updated parameters and reconciled measurements.

A method for dynamically optimizing a process that has the steps of performing an optimization cycle at a first rate and performing simultaneously with said optimization cycle a simulation cycle at a second rate which is equal to or faster than said first rate. The optimization and simulation cycles both having the step of collecting data about said process.

The simulation cycle has the additional steps of:
using said collected process data to execute in a predefined time interval during said simulation cycle a dynamic simulation for a dynamic model of said process; and
storing data for said dynamic simulation.
The optimization cycle has the additional steps of:
determining if a dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle;

calculating optimum operating targets for said dynamic process model from said collected process data when said dynamic parameter estimation and data reconciliation procedure is not needed;

determining if said optimized operating targets should be invoked;

determining if said optimization cycle should be exited if said optimized operating targets should not be invoked;

waiting until the start of the next optimization cycle when said optimization cycle should not be exited; and updating a system for controlling said process when said optimized operating targets should be invoked.

A method for dynamically optimizing a process that has the steps of performing an optimization cycle at a first rate; and performing simultaneously with said optimization cycle a simulation cycle at a second rate which is equal to or faster than said first rate. The optimization and simulation cycles both have the step of collecting data about said process.

The simulation cycle has the additional steps of:

using said collected process data to execute in a predefined time interval during said simulation cycle a dynamic simulation for a dynamic model of said process; and storing data for said dynamic simulation;

The optimization cycle has the additional steps of:

determining if a dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle; and calculating optimum operating targets for said dynamic process model from said collected process data when said dynamic parameter estimation and data reconciliation procedure is not needed.

DESCRIPTION OF THE PREFERRED EMBODIMENT(S)

Figure 1:
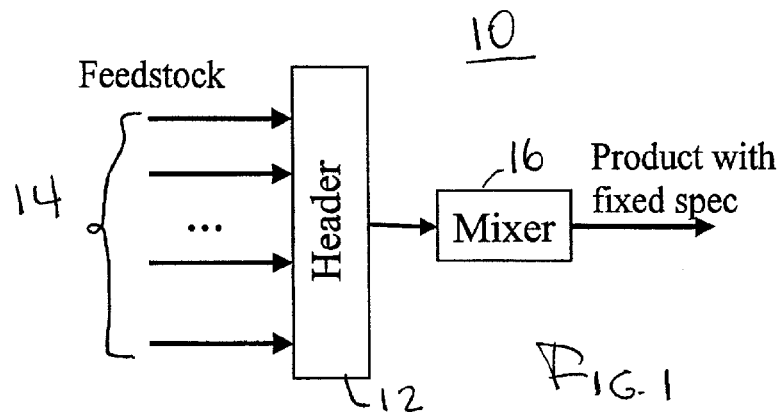
FIG. 1 shows a simplified block diagram of a process plant.

Referring now to FIG. 1, there is shown a simplified block diagram of a process plant in the form of a blender 10. The blender 10 includes a header 12 having a multiple feedstock 14 at its input and a mixer 16 which is connected to receive the output of header 12. The output of mixer 16, which may be connected to a mixed product tank or a pipeline tender (both not shown in FIG. 1), is the product with the fixed specification. It should be appreciated that blender 10 is only one example of a blender and that blenders come, as is well known to those of ordinary skill in the art, in many different embodiments. It should further be appreciated that the present invention may be used with any blender no matter how that blender is embodied.

Figure 2:
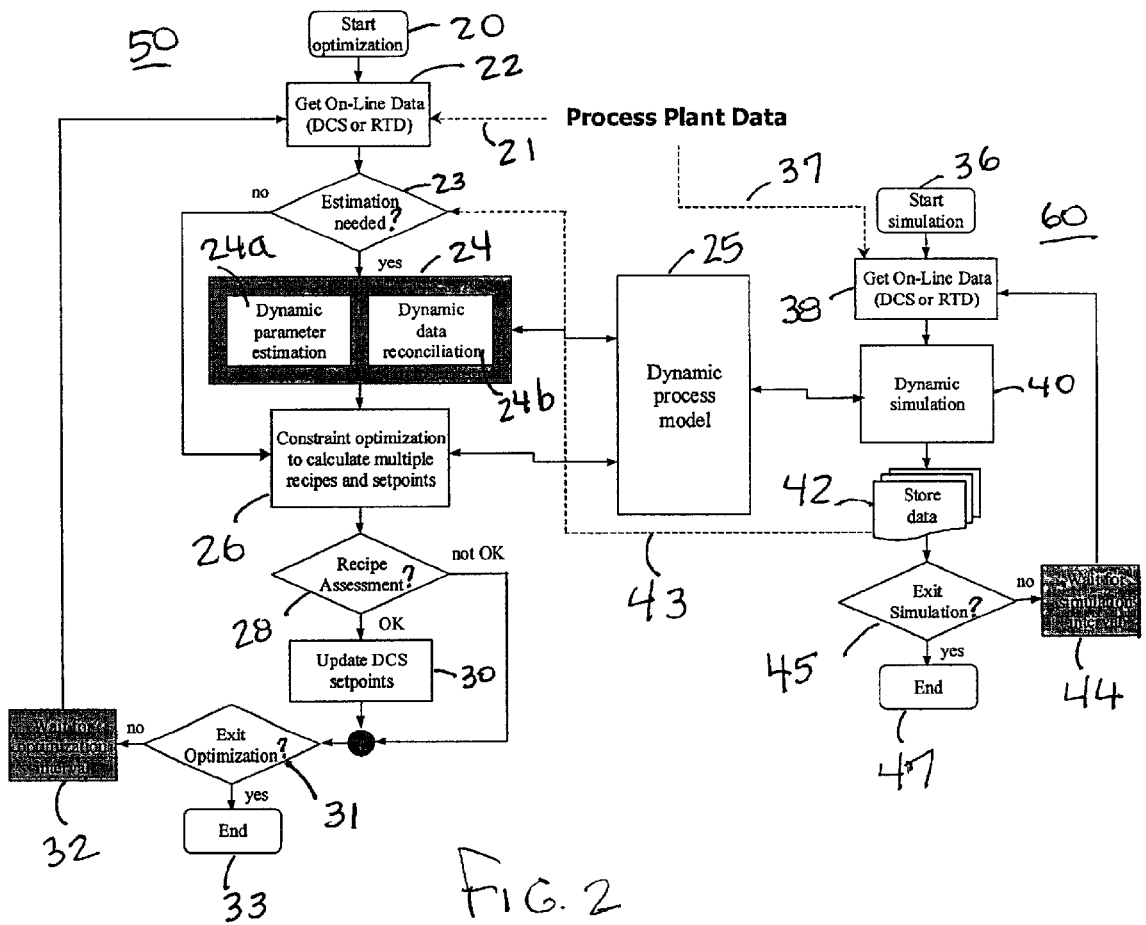
FIG. 2 shows in flow chart form the various components of the present invention.

Referring now to FIG. 2 there is shown in a flow chart form the various components of the technique of the present invention. The technique comprises an optimization cycle 50 and a simulation cycle 60. Simulation cycle 60 runs on a predetermined time interval as does optimization cycle 50.

Normally cycle 60 runs at a much higher rate than cycle 50 as cycle 60 provides, as is described below, through block 40 the dynamic simulation and it is desired in the technique of the present invention to follow the dynamic changes in the operation of blender 10. Cycle 60, may however, also run at a rate which is equal to the rate of cycle 50.

Start block 20 is the entry into the optimization cycle 50 of the technique of the present invention. Block 20 provides from plant data stored in the computer software system (not shown) on which the technique of the present invention is running, the preliminary optimization model configuration, on-line data exchange and system checks and initializes the data models in support of further application processing.

The first functional step in the optimization cycle 50 is the Get On-Line Data block 22. Block 22 is where the technique of the present invention collects, as is shown by dashed line 21, data from the field about the process plant, which in this embodiment is blender 10, such as pertinent process, laboratory and user input data through standard interfaces. For example, on-line process data is gathered either from a distributed control system (DCS) or a real time database (RT DB). The data can be either raw plant data or preprocessed plant data.

The technique then proceeds to estimation block 23 in order to determine if an estimation procedure is needed on the parameters of the dynamic process model 25 as part of the optimization cycle 50. If block 23 determines that an estimation procedure is needed, the data gathered by block 22 is used first in the dynamic parameter estimation and data reconciliation block 24; and then in the constraint optimization procedures of block 26.

Block 23 invokes a determination of whether an estimation procedure is needed utilizing heuristic-based rules and mathematical techniques operating on both the on-line data from block 22 and prior-simulated model data held in store data block 42. Dashed line 43 of FIG. 2, shows the flow of data from the store data block 42 to block 23. Generally, the estimation procedure will not be needed if the on-line data from the field does not deviate significantly from, that is the data from the field is substantially identical to, the model data calculated during the simulation cycle 60 corresponding to the same time period as that for the data retrieved in block 22. The operator of the process facility that is using the technique of the present invention provides the criteria for determining if there is or is not a significant deviation, that is, if the field data is or is not substantially identical to the model data. If an estimation procedure is not needed, the optimization cycle 50 passes directly to block 26; otherwise, parameter and data reconciliation in block 24 is performed.

Block 24 comprises a dynamic parameter estimation sub-block 24a and a dynamic data reconciliation sub-block 24b. The user of the modeling technique of the present invention wants to determine the set of model parameters used in a given dynamic process model 25 that causes the model response(s) to most closely match corresponding set(s) of actual operational data from the plant. This is the data that has been collected by block 22. Blocks 24a and 24b perform the data reconciliation and parameter estimation together within one application using a linear least squares or other minimization technique. Block 24a includes limits that are imposed on the parameters that are being changed to ensure model validity. In the embodiment of the invention described herein a bias (or slack) variable is added to each measured variable producing an additional reconciled variable. As those of ordinary skill in the art can appreciate the data reconciliation procedure of which bias is one example may take other forms.

The objective of the parameter estimation and reconciliation procedure is to determine the model parameters and biases that minimize the differences between the model predictions and experimental results. One type of mathematical approach utilized is a linear least squares method in the form set forth in equation (1):

$$\operatorname*{Min}_{\theta\,\theta} J = \sum_{l=1}^{L} W_l \sum_{i=1}^{I} w_i^2 \sum_{k=1}^{K} (z_{li}(t_k) - \hat{z}_{lik})^2 \quad (1)$$

where $\theta$ are the model parameters and measurement biases, $W_1$ is the weight of the experiment, $w_i$ is the weight for the measured variable and z are the model predictions. z actually contains the measured variables plus bias or slack variables. Weights are also required for the bias variables.

The updated parameters and reconciled measurements from block 24 are utilized in the model executions under the constraint optimization procedure of block 26.

Constraint Optimization to Calculate Multiple Recipes and Setpoints block 26 provides optimization of the model 25. The optimization consists of an objective function (normally economic based which in this case is the minimization of the cost of blend) and a set of constraints that must not be violated (product quality attributes, unit operating constraints, etc.). By acting upon the pre-configured dynamic model 25, multiple sets of recipes at differing periods of time are identified by the optimization technique of block 26 to minimize the objective function and ensure all constraints are satisfied. Of course, a typical embodiment for the optimizer of block 26 has the capability of dealing with an optimization failure and taking appropriate corrective action such as, for example, using a previous recipe.

Optimum recipe(s) from the optimization procedure of block 26 are passed to the recipe assessment procedure of block 28.

Recipe Assessment block 28 uses mathematical and heuristic (rule-based) assessment tools to determine if or if not the optimum recipes found by block 26 should be invoked. The reasons for the assessment tools of block 28 to reject a found optimum recipe include, but are not limited to, bounds violations imposed on the optimum recipe calculations, heuristic rules that determine when a blender is not in a valid operating state and an inadequate number of on-line sensor measurements being reported as valid.

Bounds violations are normally imposed by the user but also can be a representation of equipment capability. These will be upper and/or lower limits on operating targets that will be imposed by the user.

Heuristic-based determinations include rule-based procedures that identify abnormal operating states of equipment. Examples may include ramp-up in blending, regeneration cycles in reactive processes, etc. These can be determined through the use of boolean flags reported from a distributed control system or accessing the operating state through pump and valve conditions.

If block 28 decides that the found recipes should not be invoked the technique of the present invention proceeds to block 31 wherein it decides if it should or should not exit the optimization cycle 50. If it is decided to exit the cycle 50 the technique proceeds to end block 33. If it is decided not to exit the cycle 50 the technique waits in wait block 32 until it is time to begin the next optimization cycle 50. When that time has occurred the technique returns back to block 22 to collect new pertinent process, laboratory and user input data through the standard interfaces and determine a new set of model parameters for use in the dynamic process model of block 25.

If block 28 decides that the found recipes should be invoked then the technique proceeds to block 30 whereby all of the setpoints of the DCS are updated. The technique then proceeds to block 31 to decide of the optimization cycle 50 should be exited and then either to block 33 if the cycle is to be exited or to block 32 where it waits until the time for the beginning of the next optimization cycle 50. The technique of the present invention then returns back to block 22 to collect new pertinent process, laboratory and user input data through the standard interfaces and determine a new set of model parameters for use in the dynamic process model of block 25.

Start block 36 is the entry into the simulation cycle 60 of the technique of the present invention. Block 36 provides from plant data stored in the computer software system (not shown) on which the technique of the present invention is running, the preliminary simulation model configuration, on-line data exchange and system checks and initializes the data models in support of further application processing.

The first functional step in the simulation technique is the Get On-Line Data block 38. Block 38 is where the technique of the present invention collects, as is shown by dashed line 37, data from the field about the process plant, which in this embodiment is blender 10, such as pertinent process, laboratory and user input data through standard interfaces. For example, on-line process data is gathered either from a distributed control system (DCS) or a real time database (RT DB). The data gathered by block 38 is used in the dynamic simulation procedures of block 40.

Dynamic simulation block 40 provides a simulation execution of the dynamic process model 25 on a predefined time interval. The results of the dynamic simulation are used to match model response to actual plant response in block 23 in determining whether there will be a need for parameter estimation in block 24. Additionally, dynamic simulation provides an inferred measurement of the mixed product tank or pipeline tender to which the output of mixer 16 is connected to ensure that quality specifications are being met by the dynamic blend optimization system.

The results of the simulation run are stored in the store data block 42 so that they can be used in block 23 during the next optimization cycle 50 for determining if an estimation procedure is needed in that optimization cycle 50.

Following the storage of simulation results in block 42, flow is directed to block 45 wherein it decides if it should or should not exit the simulation cycle 60. If it is decided to exit the cycle 60 the technique proceeds to end block 47. If it is decided not to exit the cycle 60 the technique proceeds to block 44 where the simulation cycle 60 of the technique of the present invention waits until it is time to begin the next simulation cycle at which time flow is directed again to block 38 to commence the next simulation cycle 60.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for dynamically optimizing a process comprising the steps of:

performing an optimization cycle at a first rate;

performing simultaneously with said optimization cycle a simulation cycle at a second rate which is equal to or faster than said first rate;

said simulation cycle comprising the steps of:

collecting data about said process;

using said collected process data to execute in a predefined time interval during said simulation cycle a dynamic simulation for a dynamic model of said process;

storing data for said dynamic simulation;

said optimization cycle comprising the steps of:

collecting data about said process;

determining if a dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle;

performing a dynamic parameter estimation and data reconciliation procedure to provide updated parameters and reconciled measurements for said data stored for said dynamic simulation when said procedure has been determined to be needed; and calculating optimum operating targets for said dynamic process model either from said collected process data when said dynamic parameter estimation and data reconciliation procedure is not needed or from said updated parameters and reconciled measurements when said procedure has been determined to be needed.

2. The method of claim 1 wherein said optimization cycle further includes the steps of:

determining if said optimized operating targets should be invoked; and determining if said optimization cycle should be exited cycle when said optimized operating targets should not be invoked.

3. The method of claim 2 wherein said optimization cycle further includes the step of waiting until the start of the next optimization cycle when said optimization cycle should not be exited.

4. The method of claim 1 wherein said optimization cycle further includes the steps of:

determining if said optimized operating targets should be invoked; and updating a system for controlling said process when said optimized operating targets should be invoked.

5. The method of claim 4 further including the steps of:

determining after said system is updated if said optimization cycle should be exited; and waiting until the start of the next optimization cycle when said optimization cycle should not be exited.

6. The method of claim 1 wherein said data about said process is collected in said optimization and simulation cycles from a system for controlling said process.

7. The method of claim 1 wherein said data about said process is collected in said optimization and simulation cycles from a real time database.

8. A method for dynamically optimizing a process comprising the steps of:

performing an optimization cycle at a first rate;

performing simultaneously with said optimization cycle a simulation cycle at a second rate which is equal to or faster than said first rate;

said optimization and simulation cycles both comprising the step of collecting data about said process;

said simulation cycle further comprising the steps of:

using said collected process data to execute in a predefined time interval during said simulation cycle a dynamic simulation for a dynamic model of said process; and storing data for said dynamic simulation;

said optimization cycle further comprising the steps of:

performing a dynamic parameter estimation and data reconciliation procedure to provide updated parameters and reconciled measurements for said data stored for said dynamic simulation when said dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle;

calculating optimum operating targets for said dynamic process model from said updated parameters and reconciled measurements;

determining if said optimized operating targets should be invoked;

determining if said optimization cycle should be exited if said optimized operating targets should not be invoked;

waiting until the start of the next optimization cycle when said optimization cycle should not be exited; and updating a system for controlling said process when said optimized operating targets should be invoked.

9. A method for dynamically optimizing a process comprising the steps of:

performing an optimization cycle at a first rate;

performing simultaneously with said optimization cycle a simulation cycle at a second rate which is equal to or faster than said first rate;

said optimization and simulation cycles both comprising the step of collecting data about said process;

said simulation cycle further comprising the steps of:

using said collected process data to execute in a predefined time interval during said simulation cycle a dynamic simulation for a dynamic model of said process; and storing data for said dynamic simulation;

said optimization cycle further comprising the steps of:

performing a dynamic parameter estimation and data reconciliation procedure to provide updated parameters and reconciled measurements for said data stored for said dynamic simulation when said dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle; and calculating optimum operating targets for said dynamic process model from said updated parameters and reconciled measurements.

10. The method of claim 9 wherein said optimization cycle further includes the steps of:

determining if said optimized operating targets should be invoked; and updating a system for controlling said process when said optimized operating targets should be invoked.

11. The method of claim 9 wherein said optimization cycle further includes the steps of:

determining if said optimized operating targets should be invoked; and determining if said optimization cycle should be exited cycle when said optimized operating targets should not be invoked.

12. The method of claim 11 wherein said optimization cycle further includes the step of waiting until the start of the next optimization cycle when said optimization cycle should not be exited.

13. The method of claim 9 wherein said data about said process is collected in said optimization and simulation cycles from a system for controlling said process.

14. The method of claim 9 wherein said data about said process is collected in said optimization and simulation cycles from a real time database.

15. A method for dynamically optimizing a process comprising the steps of:

performing an optimization cycle at a first rate;

performing simultaneously with said optimization cycle a simulation cycle at a second rate which is equal to or faster than said first rate;

said optimization and simulation cycles both comprising the step of collecting data about said process;

said simulation cycle further comprising the steps of:

using said collected process data to execute in a predefined time interval during said simulation cycle a dynamic simulation for a dynamic model of said process; and storing data for said dynamic simulation;

said optimization cycle further comprising the steps of:

determining if a dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle;

calculating optimum operating targets for said dynamic process model from said collected process data when said dynamic parameter estimation and data reconciliation procedure is not needed;

determining if said optimized operating targets should be invoked;

determining if said optimization cycle should be exited if said optimized operating targets should not be invoked;

waiting until the start of the next optimization cycle when said optimization cycle should not be exited; and updating a system for controlling said process when said optimized operating targets should be invoked.

16. A method for dynamically optimizing a process comprising the steps of:

performing an optimization cycle at a first rate;

performing simultaneously with said optimization cycle a simulation cycle at a second rate which is equal to or faster than said first rate;

said optimization and simulation cycles both comprising the step of collecting data about said process;

said simulation cycle further comprising the steps of:

using said collected process data to execute in a predefined time interval during said simulation cycle a dynamic simulation for a dynamic model of said process; and storing data for said dynamic simulation;

said optimization cycle further comprising the steps of:

determining if a dynamic parameter estimation and data reconciliation procedure is needed to minimize differences between said collected process data and said data stored for said dynamic simulation calculated during a simulation cycle corresponding to a period of time which is the same as the time period during which said process data was collected during said simulation cycle; and calculating optimum operating targets for said dynamic process model from said collected process data when said dynamic parameter estimation and data reconciliation procedure is not needed.

17. The method of claim 16 wherein said optimization cycle further includes the steps of:

determining if said optimized operating targets should be invoked; and updating a system for controlling said process when said optimized operating targets should be invoked.

18. The method of claim 16 wherein said optimization cycle further includes the steps of:

determining if said optimized operating targets should be invoked; and determining if said optimization cycle should be exited cycle when said optimized operating targets should not be invoked.

19. The method of claim 18 wherein said optimization cycle further includes the step of waiting until the start of the next optimization cycle when said optimization cycle should not be exited.

20. The method of claim 16 wherein said data about said process is collected in said optimization and simulation cycles from a system for controlling said process.

21. The method of claim 16 wherein said data about said process is collected in said optimization and simulation cycles from a real time database.

* * * * *

UNITED STATES PATENT AND TRADEMARK OFFICE
CERTIFICATE OF CORRECTION

PATENT NO. : 6,816,822 B1  Page 1 of 1
APPLICATION NO. : 09/639543
DATED : November 9, 2004
INVENTOR(S) : Todd M. Hess et al.

It is certified that error appears in the above-identified patent and that said Letters Patent is hereby corrected as shown below:

On the title page, under item (75), "Inventors", insert: --Fred W. Czubba, Brick, New Jersey (US)--

Signed and Sealed this

Thirty-first Day of March, 2009

JOHN DOLL
*Acting Director of the United States Patent and Trademark Office*